United States Patent
Forster

[11] Patent Number: 5,397,281
[45] Date of Patent: Mar. 14, 1995

[54] SHIFTABLE PLANETARY TRANSMISSION

[75] Inventor: Franz Forster, Karlstadt-Muhlbach, Germany

[73] Assignee: Linde Aktiengesellschaft, Germany

[21] Appl. No.: 23,958

[22] Filed: Feb. 26, 1993

[30] Foreign Application Priority Data

Feb. 27, 1992 [DE] Germany .......... 42 06 100.8

[51] Int. Cl.$^6$ .............................................. F16H 3/44
[52] U.S. Cl. .............................................. 475/83
[58] Field of Search ............... 475/83, 140, 141, 146; 192/85 AA

[56] References Cited

U.S. PATENT DOCUMENTS 2,254,335  9/1941  Vincent ................ 475/140 X
4,026,167  5/1977  Archer .................... 74/785
4,185,520  1/1980  Henneman et al. ........... 475/83
4,625,587  12/1986  Hosono ...................... 74/752

Primary Examiner—Dirk Wright
Attorney, Agent, or Firm—Webb Ziesenheim Bruening Logsdon Orkin & Hanson

[57] ABSTRACT

A shiftable planetary transmission having a housing, a non-rotatable or rotatable transmission component, a sun gear, a carrier and at least one planet gear mounted on the carrier. A rotatable ring gear is connected to the non-rotatable or rotatable transmission component. The ring gear has an annular surface facing the interior surface of the transmission component and a coupling arrangement is non-rotatably connected to the ring gear and a spring-loaded hydraulic activation mechanism is located within the ring gear to axially move the coupling arrangement.

14 Claims, 2 Drawing Sheets

SHIFTABLE PLANETARY TRANSMISSION

BACKGROUND OF THE INVENTION

1. Field of the Invention

The invention is a shiftable planetary transmission having a sun gear, at least one planet gear mounted on a carrier, and a rotatable ring gear, which can be coupled with a non-rotatable or a rotatable transmission component.

2. Description of the Prior Art

Planetary transmissions are known in many forms and are used advantageously in vehicle drives to achieve multiple stage reductions between a high-speed motor and a significantly slower output element, such as a vehicle wheel, because they save space. Planetary transmissions are also used in construction machines because they are shiftable under load and permit relatively high travel speeds during operation over the road. As a rule, the desired higher travel speeds cannot be obtained with the hydrostatic transmission which is required for operation of the construction vehicle at a construction site.

To obtain the different shift modes, coupling or brake plates are usually provided to connect the rotatable components of the planetary transmission with other transmission components which may be stationary or rotatable. For example, a stationary transmission component may be the transmission housing and rotatable transmission components may be the carrier or the sun gear of the planetary transmission.

If a rotatable ring gear is coupled with a rotatable sun gear, a direct drive results. Alternatively, rotation of the ring gear may be prevented by coupling it with the transmission housing to provide a braking mode.

With a driven sun gear and a stationary carrier, it is possible to increase the torque on the rotatable ring gear. With a driven sun gear and a stationary ring gear, i.e., the ring gear is coupled to the transmission housing, it is possible to increase the torque on the rotatable carrier. These two modes are reduction modes, with the latter variation (output via the rotatable carrier) used more frequently. If both the carrier and the ring gear are freely rotatable, the planetary transmission is in a free-wheeling mode.

The activation of the coupling or the brake plates is generally accomplished hydraulically, which requires significant structural and assembly costs. Furthermore, the arrangement for moving the plates contributes to the size of the planetary transmission.

SUMMARY OF THE INVENTION

An object of the present invention is to provide a planetary transmission having a relatively small size. This object is fulfilled by providing a non-positively and/or a positively active coupling which is non-rotatably connected to the ring gear. The coupling includes movable plates for contacting a rotatable transmission component or a component which is non-rotatably connected to it by an activation mechanism located within the ring gear. The invention thus consists in locating the activation mechanism for the non-rotatable connection of the ring gear with a transmission component located inside of the ring gear. This design requires less space than prior art planetary transmissions.

In a first embodiment of the shiftable planetary transmission according to the invention, the transmission component is either integral with the transmission housing or fixed thereto. The transmission is capable of shifting between the free-wheeling mode and reduction operating mode.

In another embodiment of the invention, a second non-positively and/or positively active coupling arrangement is provided on the face of the ring gear facing the carrier. The coupling plate can be moved into contact with the carrier or with a component connected to the carrier by a second activation mechanism disposed within the ring gear. This arrangement provides an additional shift capability wherein the ring gear can be connected to both the transmission housing and to the carrier to provide a braking mode.

It is advantageous if the activation mechanism for each coupling arrangement includes at least one ring groove formed in the ring gear in which a spring-loaded axially movable annular piston is located. The annular piston has an active piston surface which can be hydraulically activated against the spring force. Such an activation mechanism is simple to manufacture and has a relatively small number of component parts. Additionally, the activation mechanisms of both coupling arrangements can be combined. In order to obtain the different shift modes of the shiftable planetary transmission, the piston surfaces of the two annular pistons can be independently hydraulically activated. The spring force on the annular pistons may be achieved, for example, by plate springs. It is also possible to form a plurality of holes through the perimeter of the ring gear, to connect the ring grooves with each other and to place a spring in each hole to push the two annular pistons apart.

According to a further embodiment of the invention, the transmission component consists of an annular brake plate non-rotatably connected to the sun gear and extending radially in the region of the ring gear. The activation mechanism of the coupling arrangement includes an axial ring groove in the ring gear. A spring-loaded annular piston is located in the ring groove and is axially movable relative to the brake plate. The annular piston has an active piston surface which can be hydraulically activated against the spring force. An annular stop plate is non-rotatably connected to the ring gear on the side of the brake plate opposite from the annular piston.

In an improvement of the invention, provision is made for a second non-positively and/or positively active coupling arrangement which can be brought into contact with the ring gear or with a component connected to the ring gear by an activation mechanism located outside of the ring gear. It is advantageous if the activation mechanism of the second coupling arrangement has an axial ring groove in a component fixed to the housing and opposing one face of the ring gear. A spring-loaded annular piston is located in the ring groove and is axially movable relative to the ring gear. The annular piston has an active piston surface located opposite the annular stop plate which can be hydraulically activated in opposition to a spring force.

The coupling arrangements in the planetary transmission according to the invention can be either positive couplings, such as claw couplings, or nonpositive couplings, such as friction couplings. A nonpositive coupling is particularly advantageous when a coupling is shiftable under load.

The invention can be used in many ways independently of the type of drive of the planetary transmission.

For example, an electric motor can be used as the drive. However, it is particularly advantageous when a hydrostatic axial piston engine is provided on the input side of the shiftable planetary transmission and the shaft of the engine is formed by the sun gear. Thus, a hydraulic medium can be introduced from the hydraulic circuit to act on the active surfaces of the annular pistons.

A complete understanding of the invention will be obtained from the following description when taken in connection with the accompanying drawings wherein like reference characters identify like parts throughout.

DESCRIPTION OF THE PREFERRED EMBODIMENTS

Figure 1:
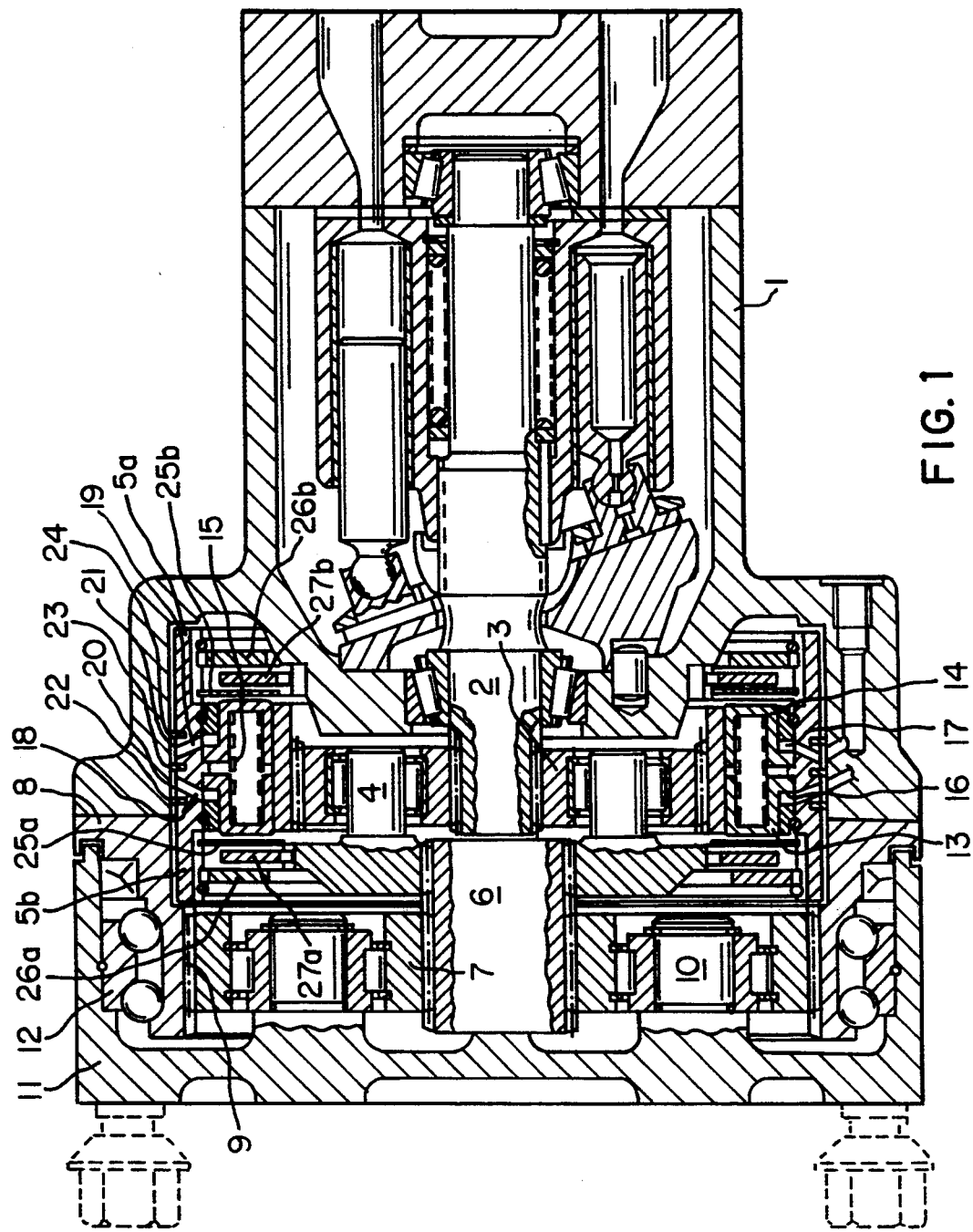
FIG. 1 is a longitudinal section through a transmission according to the invention.

The shiftable planetary transmission according to the invention in both embodiments shown in the drawings is driven by a hydrostatic swash-plate type axial piston engine 1 and may drive a vehicle wheel.

With reference to FIG. 1 of the drawings, it will be seen that the output shaft of axial piston engine 1 is the sun gear 2 of the first stage of a two-stage planetary transmission. Planet gears 3 are mounted on a carrier 4 and are in mesh with a ring gear 5 which rotates on sun gear 2. The carrier 4 is non-rotatably connected to a sun gear 6 of the second stage of the planetary transmission. The sun gear 6 of the second stage meshes with planet gears 7, which rotate in a ring gear 9 formed on the inner side of a wheel hub carrier 8 and are mounted on a carrier 10 which serves as the output wheel hub 11. A bearing 12 is located between wheel hub 11 and wheel hub carrier 8. The housing of the transmission is formed by wheel hub carrier 8 and the part of the housing of axial piston engine 1 which serves as a flange.

Ring gear 5 is rotatably mounted in the transmission housing and has an axial ring groove formed on each face. An axially movable annular piston 13 or 14 is located in each axial ring gear. The axial ring grooves are connected to each other by a plurality of axial passages formed in the perimeter of the ring gear and a compression spring 15 is located in each axial passage. The force of springs 15 push annular pistons 13 and 14 away from each other. An active piston surface 16 or 17 is formed on annular pistons 13 or 14, respectively, and the space in front of piston surfaces 16 or 17 is connected by a drilled passageway 18 or 19 in ring gear 5 to an annular chamber 20 or 21 which is formed by three spaced sealing rings 22, 23, and 24 on the external perimeter of the ring gear between the external surface of the ring gear and the spaced internal surface of the transmission housing. Annular chamber 20, into which passageway 18 opens, is located between sealing rings 22 and 23 and annular chamber 21, into which passageway 19 opens, is located between sealing rings 23 and 24.

Each annular chamber 20 and 21 is connected to a pressurized hydraulic-medium source. The annular chambers 20 and 21 can be jointly or separately filled with a hydraulic medium. The force of the hydraulic medium on active piston surfaces 16 and 17 of annular pistons 13 and 14 axially moves the pistons either jointly or separately against the force of spring 15.

Instead of annular pistons located in the axial ring grooves, it is possible to form a plurality of axial holes around the perimeter of the ring gear with opposing pistons located therein and a spring located between the pistons. However, in this arrangement the delivery of a hydraulic medium to the piston surfaces to oppose the spring force is more complex.

Ring gear 5 has axial extensions 5a and 5b on its opposite faces. Each axial extension has splines on its internal surface and a plurality of non-twistable axially movable annular coupling plates 25a or 25b are located on the splines. Annular stop plates 26a and 26b are provided on the external side of each coupling plate. Coupling plates 25a or 25b prevent rotation of annular pistons 13 or 14 in the ring groove. However, if annular pistons 13 and 14 are located in the ring grooves with torsional protection, it is possible to dispense with coupling plates 25a and 25b. This is particularly true if annular pistons 13 and 14 are provided with friction surfaces on the external faces.

Coupling plate 25a is acted on by annular piston 13 and stop plate 26a acts with one or a plurality of coupling plates 27a non-rotatably connected to and axially movable with carrier 4. Coupling plate 25b is acted on by annular piston 14 and stop plate 26b acts with one or a plurality of coupling plates 27b nonrotatably connected to and axially movable with the transmission housing.

In operation, when no pressurized hydraulic medium is present in annular chambers 20 and 21, annular pistons 13 and 14 are forced apart by springs 15 and are in contact with the coupling plates. The ring gear 5 is thus fixed relative to both the transmission housing and carrier 4 and the shiftable planetary transmission is in the braking mode. When annular chamber 20 and passageway 18 are filled with a hydraulic medium under pressure which is in contact with piston surface 16 of annular piston 13, the annular piston is acted on and carrier 4 is rotatable. The first stage of the planetary transmission is now in a reduction mode. When annular chamber 21 and passageway 19 are filled with a hydraulic medium under pressure which is in contact with piston surface 17 of annular piston 14, the annular piston is acted on and ring gear 5 is rotatable in the transmission housing. The first stage of the planetary transmission is now in a direct drive mode. Reduction thus occurs only by the second stage of the planetary transmission.

When both annular chambers 20 and 21 are filled with a hydraulic medium under pressure, both ring gear 5 and carrier 4 are freely rotatable and the planetary transmission is in the free-wheeling mode.

Figure 2:
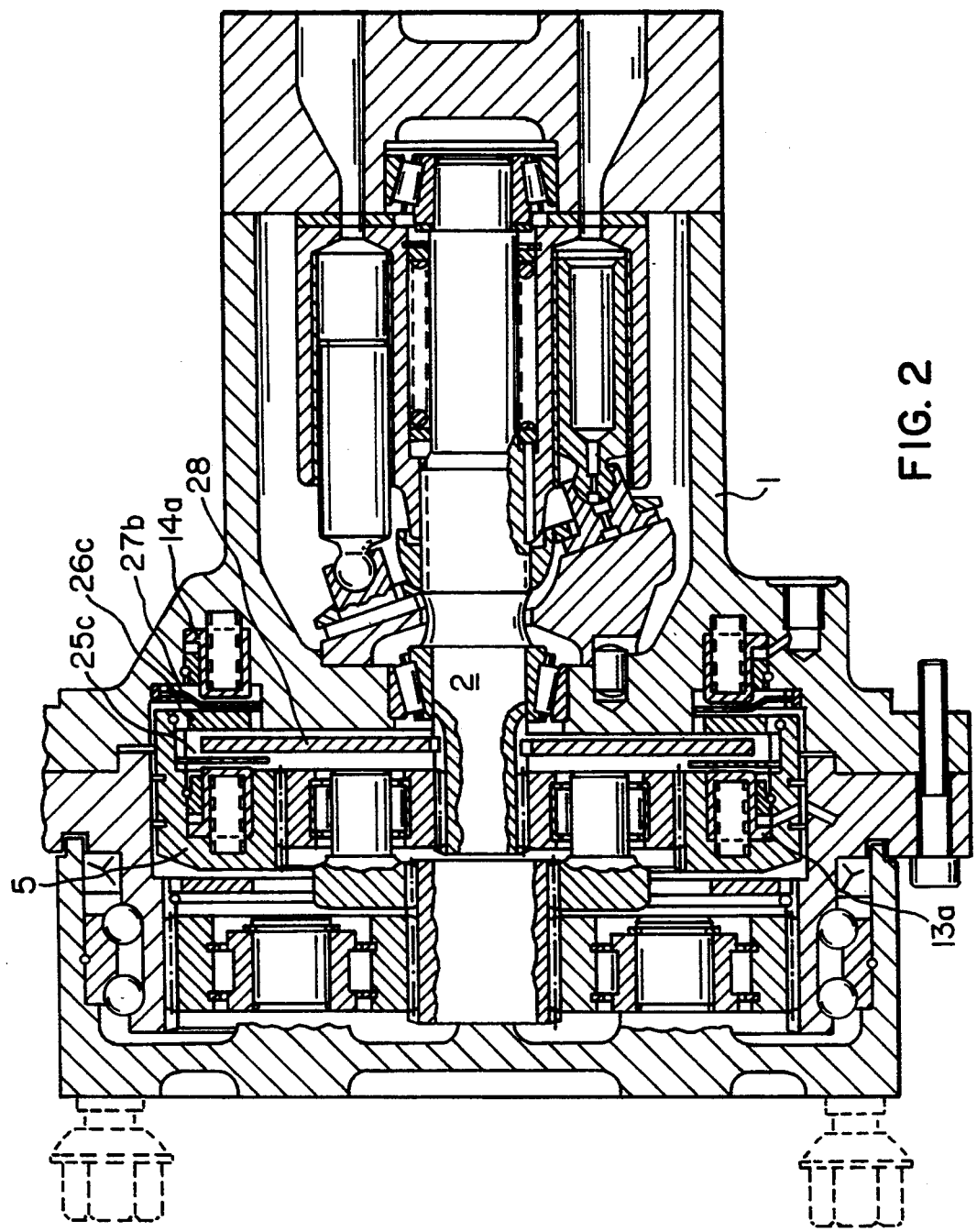
FIG. 2 is a longitudinal section through a second embodiment of a transmission according to the invention.

In the embodiment shown in FIG. 2 of the drawings, a transmission according to the invention has a ring gear 5 with only one axial ring groove with a spring-loaded annular piston 13a located therein. Annular piston 13a contacts a coupling plate 25c which is adjacent to a non-rotatable brake plate 28 which is axially movable along sun gear 2. Brake plate 28 is preferably provided on both sides with friction pads and is held against a stop plate 26c by the extension of annular piston 13a. Annular piston 13a corresponds to annular piston 13 in FIG. 1 of the drawings, while stop plate 26c corresponds to stop plate 26b. Coupling plate 25c corresponds to coupling plate 25b of FIG. 1. In both embodiments of the invention, ring gear 5 can be coupled with a rotatable transmission component, i.e., carrier 4 shown in FIG. 1 of the drawings and sun gear 2 shown in FIG. 2 of the drawings.

The operation of ring gear 5 in the transmission housing shown in FIG. 2 of the drawings is controlled by a spring-loaded annular piston 14a which opposes stop plate 26c. Annular piston 14a is axially movable in a ring groove located in transmission housing and cooperates with a non-rotatable coupling plate 27b which is axially movable in the transmission housing. The function of coupling plate 25c in the embodiment shown in FIG. 2 of the drawings is determined by the face of stop plate 26c which is opposite from annular piston 14a. In this design, the aforementioned shift modes can be obtained.

In contrast to FIG. 2 of the drawings, annular piston 14a can be located in an intermediate flange of the transmission housing instead of in the housing of axial piston engine 1. In this modified arrangement, a standard axial piston engine can be used.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which are to be given the full breadth of the appended claims and any and all equivalents thereof.

I claim:

1. A shiftable planetary transmission having a housing, a non-rotatable transmission component and a rotatable transmission component, a sun gear, a carrier, at least one planet gear mounted on said carrier, and a rotatable ring gear for connection to said non-rotatable transmission component and to said rotatable transmission component, said ring gear having a surface facing each of said transmission components, a first coupling means non-rotatably connected to said ring gear, and activation means located within said ring gear for moving said first coupling means axially relative to said ring gear into contact with a transmission component.

2. A shiftable planetary transmission as set forth in claim 1, wherein said non-rotatable transmission component is 3. A shiftable planetary transmission as set forth in claim 2, wherein one of said surfaces of said ring gear facing a transmission component has a second coupling means and a second activation means located within said ring gear for moving said second coupling means axially relative to said ring gear.

4. A shiftable planetary transmission as set forth in claim 3, wherein said activation means for each of said first and second coupling means includes at least one axial ring groove formed in said ring gear, a spring-loaded axially movable annular piston located in said at least one axial ring groove, said annular piston having an active piston surface for contact by a hydraulic medium under pressure, means for supplying a hydraulic medium under pressure to said annular piston to move said annular piston against the force of a spring and a spring located in said annular piston.

5. A shiftable planetary transmission as set forth in claim 1, wherein said rotatable transmission component is a brake plate non-rotatably mounted on said sun gear and extending radially outwardly from said sun gear toward said ring gear and said activation means for moving said coupling means includes a spring-loaded axially movable annular piston located in said ring groove, a spring located in said annular piston to move said annular piston axially in the direction of said brake plate, said annular piston having an active piston surface for contact by a hydraulic medium under pressure for moving said annular piston axially against the force of said spring, a means for supplying a hydraulic medium under pressure to said active piston surface, and an annular stop plate non-rotatably connected to said ring gear located on the side of said brake plate opposite said annular piston.

6. A shiftable planetary transmission as set forth in claim 5, including a second coupling means for contacting said ring gear and activation means for said second coupling means located outside of said ring gear.

7. A shiftable planetary transmission as set forth in claim 6, wherein said activation means for said second coupling means includes an axial ring groove formed in a component fixed to said housing opposite a surface of said ring gear, a spring-loaded axially movable annular piston located in said axial ring groove movable in the direction of said ring gear, a spring located in said annular piston, said piston having an active piston surface opposite said annular stop plate, and means for supplying a hydraulic medium under pressure to said active piston surface of said piston to oppose the force of said spring.

8. A shiftable planetary transmission as set forth in claim 1 and a hydrostatic axial piston engine coaxial with said transmission, said hydrostatic axial piston engine including a rotary shaft forming said sun gear.

9. A shiftable planetary transmission as set forth in claim 2 and a hydrostatic axial piston engine coaxial with said transmission, said hydrostatic axial piston engine including a rotary shaft forming said sun gear.

10. A shiftable planetary transmission as set forth in claim 3 and a hydrostatic axial piston engine coaxial with said transmission, said hydrostatic axial piston engine including a rotary shaft forming said sun gear.

11. A shiftable planetary transmission as set forth in claim 4 and a hydrostatic axial piston engine coaxial with said transmission, said hydrostatic axial piston engine including a rotary shaft forming said sun gear.

12. A shiftable planetary transmission as set forth in claim 5 and a hydrostatic axial piston engine coaxial with said transmission, said hydrostatic axial piston engine including a rotary shaft forming said sun gear.

13. A shiftable planetary transmission as set forth in claim 6 and a hydrostatic axial piston engine coaxial with said transmission, said hydrostatic axial piston engine including a rotary shaft forming said sun gear.

14. A shiftable planetary transmission as set forth in claim 7 and a hydrostatic axial piston engine coaxial with said transmission, said hydrostatic axial piston engine including a rotary shaft forming said sun gear.

* * * * *

UNITED STATES PATENT AND TRADEMARK OFFICE
CERTIFICATE OF CORRECTION

PATENT NO. : 5,397,281
DATED : March 14, 1995
INVENTOR(S) : Franz Forster

It is certified that error appears in the above-indentified patent and that said Letters Patent is hereby corrected as shown below:

Column 2 Line 63 "nonpositive" should read --non-positive--.

Column 2 Line 64 "nonpositive" should read --non-positive--.

Column 4 Line 26 "nonrotatably" should read --non-rotatably--.

Claim 2 Line 41 Column 5 after "is" insert --located on said housing for said transmission.--.

Signed and Sealed this

Sixth Day of June, 1995

Attest:

BRUCE LEHMAN

*Attesting Officer*     *Commissioner of Patents and Trademarks*